April 28, 1925.   1,535,263
E. A. SMETZER
COMBINATION REAR SIGNAL AND PILOT LIGHT
Filed Jan. 7, 1921   2 Sheets-Sheet 1

Inventor:

EDWARD A. SMETZER

April 28, 1925.
E. A. SMETZER
COMBINATION REAR SIGNAL AND PILOT LIGHT
Filed Jan. 7, 1921    2 Sheets-Sheet 2
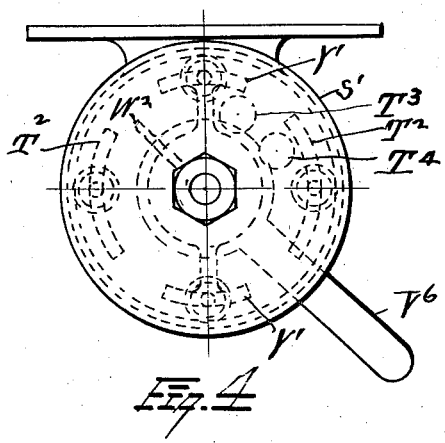
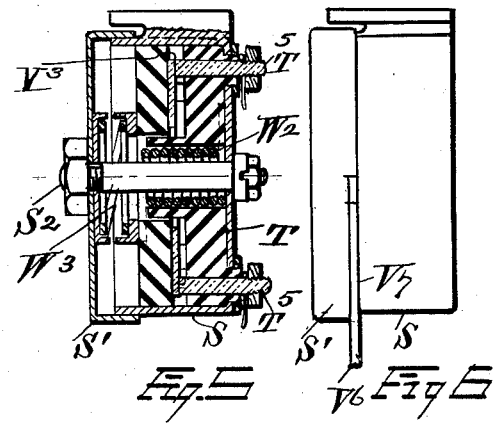
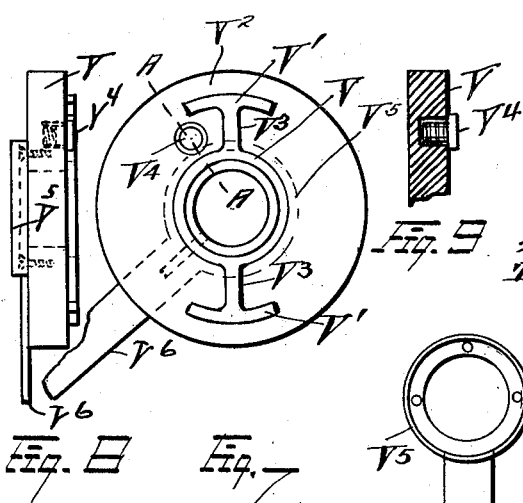
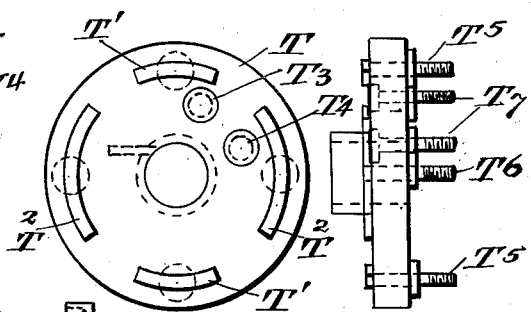
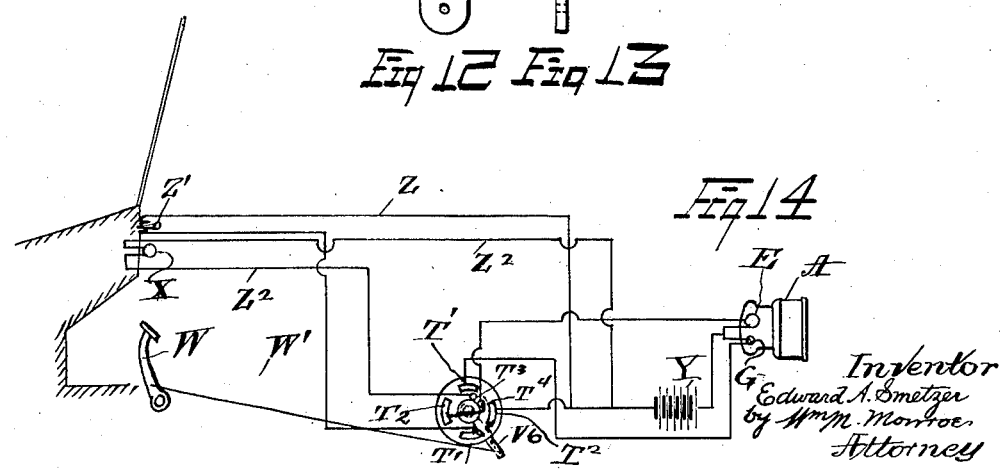

Patented Apr. 28, 1925.

1,535,263

UNITED STATES PATENT OFFICE.

EDWARD A. SMETZER, OF LAKEWOOD, OHIO.

COMBINATION REAR SIGNAL AND PILOT LIGHT.

Application filed January 7, 1921. Serial No. 435,660.

*To all whom it may concern:*

Be it known that I, EDWARD A. SMETZER, a citizen of the United States, and resident of Lakewood, in the county of Cuyahoga and State of Ohio, have invented certain new and useful Improvements in Combination Rear Signal and Pilot Lights, of which I hereby declare the following to be a full, clear, and exact description, such as will enable others skilled in the art to which it appertains to make and use the same.

The invention relates to a combination rear signal and pilot light.

The objects of the present invention are to provide an improved stop or safety signal lamp for the rear end of a motor car and a pilot indicator or detector lamp having a film of such size that it will operate at or near normal brilliancy when connected in series with the stop lamp across the battery of the motor car.

The invention includes an electric circuit common to both lamps and a source of electricity therefor, and a separate circuit for the rear lamp and a switch mechanism controlling the two lamp circuits and operated by one of the controlling levers of the car such as the brake lever.

This switch mechanism controls the two lamp circuits, one circuit containing the pilot lamp and the signal lamp in series and the other containing only the signal lamp. The first named circuit is closed first and afterwards this circuit is opened and the second named circuit is closed.

The contacts in this switch are so arranged and connected with the pilot lamp, the stop lamp and the source of current, that upon the initial movement of the movable contact bearing element a circuit is established through the pilot lamp and the stop lamp in series and upon movement of the member to its final position, the first circuit is opened and another circuit is closed through the stop lamp only. Upon opening the switch, the return movement of the contact bearing member will open the stop lamp circuit and establish a circuit through both lamps in series which circuit will also be opened as the movable member is returned to the neutral position.

This winking or momentary brilliancy of the indicator lamp will show that the stop lamp and circuit are in order since both lamps are on the same circuit and an injury to either lamp or to the circuit would be noticeable to the operator since the indicator lamp or tell-tale signal would not glow.

This method of construction is simple and permits the use of an indicator lamp of much less candle power than that of the stop or rear lamp since both lamps do not glow brilliantly at the same time. It also permits the use of a stop signal lamp of as high candle power as may be desired without the use of a relay.

The invention is exemplified in the accompanying drawings showing a form of switch embodying the invention, and is hereinafter more fully described and specifically pointed out in the claims.

In the accompanying drawings:

Figure 4 is a front elevation of the switch.

Figure 5 is a longitudinal sectional view of the switch.

Figure 6 is a side elevation of the same.

Figure 7 is a rear elevation of the movable contact member of the switch.

Figure 8 is an edge view thereof.

Figure 9 is a transverse section on the line A—A showing the contact for the pilot light on the movable section.

Figure 10 is a front elevation of the stationary portion of the switch.

Figure 11 is a side elevation thereof.

Figures 12 and 13 are detailed views of the operating arm for the switch.

Figure 14 is a diagram showing the electric circuit employed in a car.

In the accompanying drawings Y represents a battery or other source of electric current. E represents a signal or stop lamp preferably placed in the rear end of a motor car and X represents a pilot or indicator lamp on the dash in view of the driver of the car which is included in series with the signal or stop lamp in the main circuit $Z^2$. The indicator lamp is employed as a pilot light or telltale signal to flash momentarily in series with the stop lamp, when the stop lamp is thrown in or out of operation, and the cooperative switch means comprises a movable switch member $V^s$, made of conducting material and centrally pivoted and revoluble to successively close a circuit through the signal E and the pilot light X by means of a contact $V^4$ movable with the part $V^3$ and adapted to bridge the contacts $T^3$ and $T^4$. In the main circuit, the contact $V^4$ is always insulated from the part $V^3$.

Figure 1:
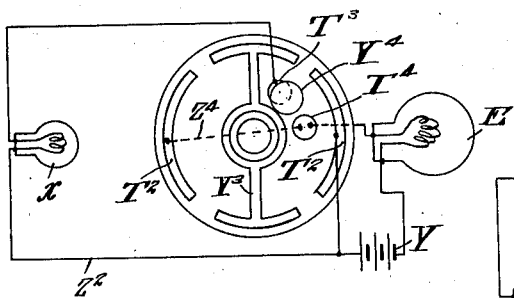
Figure 1 is a diagram showing the two circuits arranged in neutral.
Figure 2:
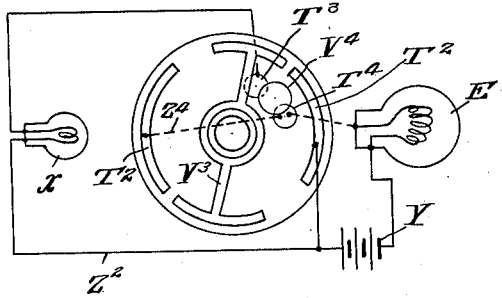
Figure 2 is a similar diagram showing both lamps in series.

The device is shown in Figure 1 in a neutral position. By movement of the switch member $V^3$, contract $V^4$ will be made to bridge the contacts $T^4$ and $T^3$ and close the main circuit $Z^2$ through both of the lamps E and X, thus causing the pilot lamp to burn brilliantly as shown in Fig. 2.

Figure 3:
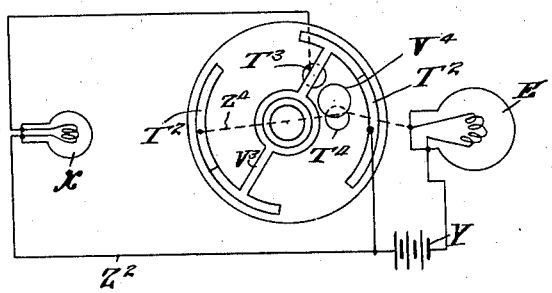
Figure 3 is a similar diagram showing the lamps with only the rear signal operating.

On further movement of the switch member $V^3$, as shown in Fig. 3, the outer ends of the contact $V^3$ will bridge contacts $T^2$ and $T^2$ opposed to each other in the path of the revolving switch arm $V^3$ and the circuit is closed through the wire $Z^4$, to the stop lamp E which causes the same to burn brilliantly. When the switch member is turned backward, all current ceases through the wire $Z^4$ and passes through the bridging contacts $T^3$, $V^4$ and $T^4$ which causes the pilot light to burn brilliantly as contact $V^3$ leaves contacts $T^2$—$T^2$ as shown in Fig. 2 until the neutral position shown in Fig. 1 is reached.

A, in Figure 14 is the shell of the rear or signal lamp which is attached to the rear of the car. In this shell or casing may be positioned the signal lamp and the tail light of the car. Within the switch casing, is secured a stationary switch member T provided with oppositely placed contacts $T^1$—$T^1$ and $T^2$—$T^2$, and closely positioned contacts $T^3$ and $T^4$ mounted upon a vulcanized base. These contacts are provided with binding posts $T^5$, $T^6$ and $T^7$ respectively.

V is a movable contact member provided with oppositely placed contacts $V^1$, $V^1$, attached to an insulating plate $V^2$. These contacts $V^1$ are connected at $V^3$ and are revoluble with the aforesaid insulating plate $V^2$. A small spring contact $V^4$ bridges the contacts $T^3$ and $T^4$ momentarily as the plate $V^2$ is revolved. The contact $V^4$ is yieldingly mounted as illustrated in Fig. 9 to provide a wiping contact. A disk $V^5$ is secured to the plate $V^2$ and an arm $V^6$ is attached to this disk and passes through a slot $V^7$ in the switch casing. This arm is operatively connected with the brake lever W or brake rod. A spring $W^2$ returns the arm to normal position and a spring $W^3$ presses the contact surfaces closely together. Upon the instrument board of the car is placed the lamp X, which acts as a light just before the signal lamp is illuminated and just after it is disconnected.

The mode of operation of the switch to operate these lamps may be described as follows:

In Figure 14 an electric diagram is shown in which Y is the battery or source of electricity. It is presumed that in normal position, the contacts $V^1$—$V^1$ will engage the contacts $T^1$—$T^1$, and complete the circuit Y, through the tail lamp G when a plug $Z^1$ on the instrument board closes the circuit Z. When the movable contact member V is moved to the right, the tail light circuit is opened, and, the contact $V^4$ bridges the contacts $T^3$ and $T^4$ and closes a circuit $Z^2$ through the pilot light X and signal lamp E. On further movement, the pilot light circuit is opened and when the contacts $V^1$ engage the contacts $T^2$—$T^2$, the circuit through the signal lamp E is closed.

What is claimed is:

1. A signal having a source of electric current, a main signal, a telltale signal, connecting means between the source of electric current, the main signal and the telltale signal including cooperating switch means comprising a movable member for successively closing a circuit through the main signal and telltale signal in series and thereafter closing a circuit through the main signal alone.

2. A single signal for vehicles having a battery, a rear end signal, a front telltale signal, connecting means between the battery, rear end signal, and telltale signal, including cooperating switch means comprising a movable member for successively closing a circuit through said rear end signal and telltale signal in series and thereafter closing a circuit through the rear end signal alone.

3. A single signal for vehicles having a battery, a rear end signal, a front telltale signal, connecting means between the battery, rear end signal, and telltale signal, including cooperating switch means comprising a movable member for successively closing a circuit through said rear end signal and telltale signal in series and thereafter closing a circuit through the rear end signal alone, in a single movement of said member in the same direction.

4. In a vehicle signal device, a rear signal on a vehicle, a pilot light in view of the driver of said vehicle, a first circuit containing said rear signal and pilot lights in series, a second circuit containing the rear signal alone, a switch mechanism for closing said first circuit, opening said first circuit and closing said second circuit successively in a single operation.

In testimony whereof, I hereunto set my hand this 5" day of January, 1921.

EDWARD A. SMETZER.

In presence of—
S. W. SANGSTER,
WM. M. MONROE.